Oct. 22, 1929.  V. ROYLE  1,732,618
STRAINER HEAD FOR EXTRUDING MACHINES
Filed Oct. 14, 1927

INVENTOR
Vernon Royle
BY
his ATTORNEYS

Patented Oct. 22, 1929

1,732,618

UNITED STATES PATENT OFFICE

VERNON ROYLE, OF PATERSON, NEW JERSEY

STRAINER HEAD FOR EXTRUDING MACHINES

Application filed October 14, 1927. Serial No. 226,155.

This invention relates to an improvement in strainer heads for extruding machines.

It has for an object to provide a device of this character which is so constructed that the output is subsantially increased without falling off in quality.

Another object consists in providing such a device in which there will not be so much back pressure upon or resistance to the action of the screw or plodder as to handicap its normal capacity for extruding the stock.

Another object consists in providing such a device in which there is an expansion chamber between the end of the screw or plodder and the strainer together with further provision for expansion outside of the strainer.

Another object consists in providing certain improvements in the form, construction and arrangement of the several parts whereby the above named and other objects may effectively be attained.

Figure 1:
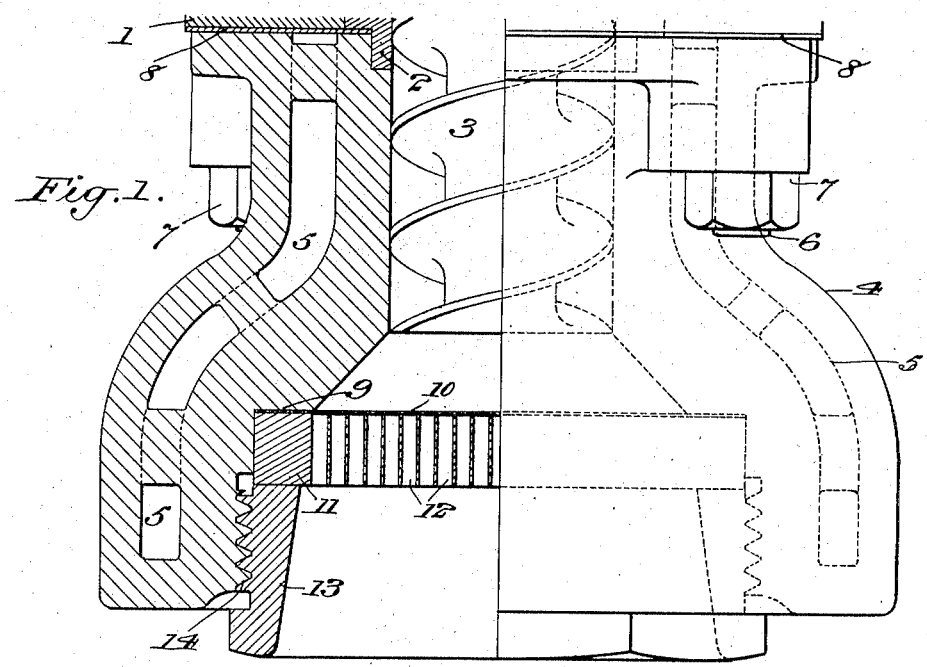
Figure 2:
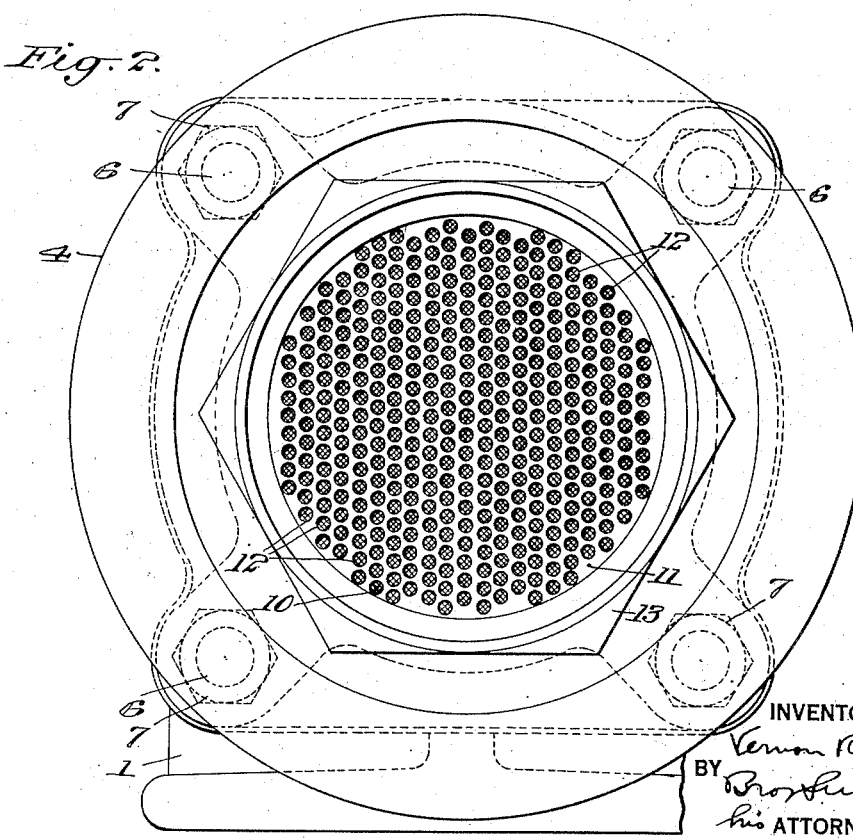

A practical embodiment of the invention is represented in the accompanying drawings, in which Fig. 1 represents a plan view partly in section, and Fig. 2 represents a front elevation.

The machine casing, to which the improved head may be attached, is indicated at 1, and its bore liner at 2. The screw or plodder is denoted by 3, and is fitted to operate within the screw receiving portion of the head, as clearly shown in Fig. 1. These parts may be of any well-known or approved form and, as their particular construction constitutes no part of this present invention, the same is not disclosed.

The strainer head as a whole is marked 4 and it may be provided with suitable passages 5 for the circulation of a temperature controlling medium in a manner well understood in this art. The head may be secured to the machine by stud bolts 6 provided with nuts 7, a washer 8 being preferably interposed between the adjacent parts. The strainer head 4 is shouldered, as indicated at 9, for the reception of a strainer or screen 10 that is forced against the said shoulder by a foraminous plate 11, the perforations in which are denoted by 12.

A ring nut 13 has its periphery threaded for mating with corresponding threads formed on the inner circumference of the strainer head 4, as indicated at 14, and it will be seen that, when the said ring nut is screwed home, it bears against the outer face of the plate 11 so as to cause the latter to jam the screen or strainer 10 against the shoulder 9 in the head, thereby securing the parts in operative assembly.

As clearly respresented in Fig. 2, the nut 13 has an angular front peripheral portion adapted for cooperation with a suitable wrench.

The strainer head is belled or flared in a forward direction, as is well shown in Fig. 1, and its interior, immediately in advance of the screw receiving portion, expands or flares abruptly to the shoulder 9. This construction provides an expansion chamber between the end of the screw and the strainer 10, so that the stock being extruded by the screw may escape with a certain amount of freedom, thus permitting the screw to act substantially at its capacity instead of restraining the latter by back pressure.

The screen or strainer 10 is also much larger in area than the cross-section of the screw receiving portion so that it has a relatively great capacity for straining the stock urged forwardly by the screw.

The ring 13 has its inner circumference also flared forwardly or outwardly, though its flare is not as abrupt as that of the interior of the head between the end of the screw and the shoulder 9. This flaring of the ring 13 serves a purpose analogous to that just described, because it facilitates the outward movement of the strained material so as to permit the screen or strainer 10 to act freely at its capacity.

In operation, the material to be strained such, for instance, as ground up old rubber products, and the like, is urged forwardly by the screw 3, passes into the flared chamber immediately in front of the screw, then through the screen 10 and holes 12 in the plate 11, and then through the ring nut 13 into the desired receptacle. The passage of the material from the screw into the adjacent chamber is more rapid than its movement from the plate 12 into the ring 13, because of the obstruction provided by the said plate and screen. The provision of the abruptly flared chamber between the screw and screen, and the less abruptly flared ring 13 conforms the device to this condition. Additionally, the fact that the screen is of much greater cross-sectional area than the screw receiving portion lends to the increase in output of the device by permitting the screw to work at or near its capacity instead of hampering it by back pressure upon the material. The screw receiving portion is, of course, of substantially the same cross-sectional size as the screw it receives or houses, and I have made tests of the increased output of the machine having the screen or other straining element greater in area than the screw or screw receiving portion, which tests show, for instance, that when a six inch diameter straining element is used with a six inch diameter screw, an output of three hundred pounds per hour is obtained; while the employment of an eight inch diameter straining element with a six inch diameter screw increases the output to six hundred pounds per hour. The device is of simple character, easily manufactured, and readily attached to any standard or approved extruding machine.

It will be understood that various changes may be resorted to in the form, construction, and arrangement of the several parts, without departing from the spirit and scope of my invention; hence, I do not intend to be limited to the details herein shown and described except as they may be included in the claims.

What I claim is:

1. A device of the character described comprising, a head adapted for operative engagement with the screw of an extruding machine, said head having an opening therethrough immediately in advance of the screw receiving portion of the head for passage of the material, and said opening being greater in area at its mouth than the cross-sectional area of the screw receiving portion of the head.

2. A device of the character described comprising, a head adapted for operative engagement with the screw of an extruding machine, said head having an opening therethrough immediately in advance of the screw receiving portion of the head for passage of the material, said opening being greater in area at its mouth than the cross-sectional area of the screw receiving portion of the head, and a straining element spaced from the end of the screw and located in said head between said mouth and the screw receiving portion, said straining element being greater in area than the cross-section of the screw receiving portion and less in area than the mouth.

3. A device of the character described comprising, a head adapted for operative engagement with the screw of an extruding machine, said head having an opening therethrough for passage of the material, said opening being flared immediately in advance of the screw receiving portion of the head and less abruptly flared adjacent its mouth.

4. A device of the character described comprising, a head adapted for operative engagement with the screw of an extruding machine, said head having an opening therethrough for passage of the material, said opening being flared immediately in advance of the screw receiving portion of the head and less abruptly flared adjacent its mouth, and a straining element spaced from the end of the screw and located between said flared portions.

5. A device of the character described comprising, a head adapted for operative engagement with the screw of an extruding machine, said head having an opening therethrough for passage of the material, said opening being flared immediately in advance of the screw receiving portion of the head and having a shoulder formed therein adjacent the outer end of said flared portion, a straining element seated against said shoulder, and a locking ring for holding the straining element in position, said locking ring also being interiorly flared.

6. A device of the character described comprising, a head adapted for operative engagement with the screw of an extruding machine, said head having an opening therethrough for passage of the material, said opening being flared immediately in advance of the screw receiving portion of the head and having a shoulder formed therein adjacent the outer end of said flared portion, a straining element seated against said shoulder, and a locking ring for holding the straining element in position, said locking ring also being interiorly flared, the flare of the locking ring being less abrupt than the flare of the opening in the head adjacent the screw receiving portion.

7. In combination with the cylinder and screw of an extruding machine, a head having a delivery opening substantially greater in cross section than the cross section of the screw, said head being fitted to be located with its opening at the forward end of the screw.

8. In combination with the cylinder and screw of an extruding machine, a head having a flaring delivery opening, said opening being substantially the same in cross section as the cross section of the screw at one end and being substantially greater in cross section at the other end, and said head being fitted to be located with the smaller end of its opening at the forward end of the screw.

In testimony, that I claim the foregoing as my invention, I have signed my name this 11th day of October, 1927.

VERNON ROYLE.